US012607833B2

(12) United States Patent
Won et al.

(10) Patent No.: US 12,607,833 B2
(45) Date of Patent: Apr. 21, 2026

(54) LENS OPTICAL SYSTEM

(71) Applicant: HYUNDAI MOBIS CO., LTD., Seoul (KR)

(72) Inventors: Yong Hee Won, Yongin-si (KR); Jae Myung Ryu, Gumi-Si (KR)

(73) Assignee: HYUNDAI MOBIS CO., LTD., Seoul (KR)

( * ) Notice: Subject to any disclaimer, the term of this patent is extended or adjusted under 35 U.S.C. 154(b) by 364 days.

(21) Appl. No.: 18/451,932

(22) Filed: Aug. 18, 2023

(65) Prior Publication Data

US 2024/0077706 A1     Mar. 7, 2024

(30) Foreign Application Priority Data

Sep. 2, 2022     (KR) ........................ 10-2022-0111641

(51) Int. Cl.
     *G02B 9/34*          (2006.01)
     *G02B 13/18*         (2006.01)
(52) U.S. Cl.
     CPC ............... *G02B 13/18* (2013.01); *G02B 9/34* (2013.01)

(58) Field of Classification Search
CPC ............................... G02B 9/34; G02B 13/004
See application file for complete search history.

(56) References Cited

U.S. PATENT DOCUMENTS

2004/0051957 A1* 3/2004 Liang ..................... G02B 21/02
                                                        359/656

FOREIGN PATENT DOCUMENTS

KR          101491283 B1     2/2015

* cited by examiner

*Primary Examiner* — Joseph P Martinez
(74) *Attorney, Agent, or Firm* — NovoTechIP International PLLC

(57)          ABSTRACT

A four-lens optical system is provided which is capable of minimizing a total length of an optical system while having a high numerical aperture (NA), and, more particularly, to an optical system including a first lens, a second lens, a third lens, and a fourth lens that are sequentially arranged from an object side to an image side of the four-lens optical system, in which the first lens and the second lens continuously disposed in front of the optical system are each configured to have positive refractive power and in which the first lens is a lens is made of a plastic material, and the fourth lens is a lens made of a glass material.

17 Claims, 3 Drawing Sheets

LENS OPTICAL SYSTEM

In one general aspect, a lens optical system includes a first lens, a second lens, a third lens, and a fourth lens that are sequentially arranged from an object side to an image side, in which NA may be 0.6 or more, the first lens and the second lens may each have positive refractive power, the first lens may be a lens made of a plastic material, and the fourth lens may be a lens made of a glass material.

The lens optical system of the present invention may satisfy Formula below.

$$2 < \frac{f_1}{f_{12}} < 15 \qquad \langle\text{Formula}\rangle$$

(Where f1 denotes a focal length of the first lens, and f12 denotes a combined focal length of the first and second lenses)

The lens optical system of the present invention may satisfy Formula below $$0.8 < \frac{f_2}{f_{12}} < 2 \qquad \langle\text{Formula}\rangle$$

(Where f2 denotes a focal length of the second lens, and f12 denotes a combined focal length of the first and second lenses)

The lens optical system of the present invention may satisfy Formula below.

$$0 \le \frac{R_1}{R_2} \le 1 \qquad \langle\text{Formula}\rangle$$

(Where R1 denotes a radius of curvature of the object side of the first lens, and R2 denotes a radius of curvature of the image side of the first lens)

The lens optical system of the present invention may satisfy Formula below.

$$0.25 \le \frac{D_4}{D_1} \le 0.5 \qquad \langle\text{Formula}\rangle$$

(Where D1 is a diameter of the first lens, and D4 is a diameter of the fourth lens)

The lens optical system of the present invention may satisfy Formula below.

$$0.3 \le \frac{R_{min}}{f} \le 0.5 \qquad \langle\text{Formula}\rangle$$

(Where Rmin denotes a radius of curvature of the side having a smaller absolute value of a radius of curvature of the object side and a radius of curvature of the image side of the third lens, and f denotes a total combined focal length of the first to fourth lenses)

The lens optical system of the present invention may satisfy Formula below.

$$0.4 \le \frac{R_7}{f} \le 0.6 \qquad \langle\text{Formula}\rangle$$

(Where R7 denotes a radius of curvature of the object side of the fourth lens, and f denotes a total combined focal length of the first to fourth lenses)

The lens optical system of the present invention may satisfy Formula below.

$$0 \le \frac{R_3}{R_1} \le 1 \qquad \langle\text{Formula}\rangle$$

(Where R1 denotes a radius of curvature of the object side of the first lens, and R3 denotes a radius of curvature of the object side of the second lens)

The first lens may be an aspherical lens.

The third lens may have negative refractive power, and an Abbe number of a material of the third lens may be 25 or less.

The first lens may be an aspherical lens, and any one of the second lens and the third lens may be an aspherical lens, and among the first to fourth lenses, the aspherical lens may be composed of two or less in total.

The fourth lens may have a refractive index of 1.7 or more.

The Abbe numbers of the material of the first lens and the material of the second lens may be 50 or more.

A diameter of the lens may sequentially decrease as it progresses from the first lens to the fourth lens.

DETAILED DESCRIPTION

Detailed Description of Main Elements

Figure 1:
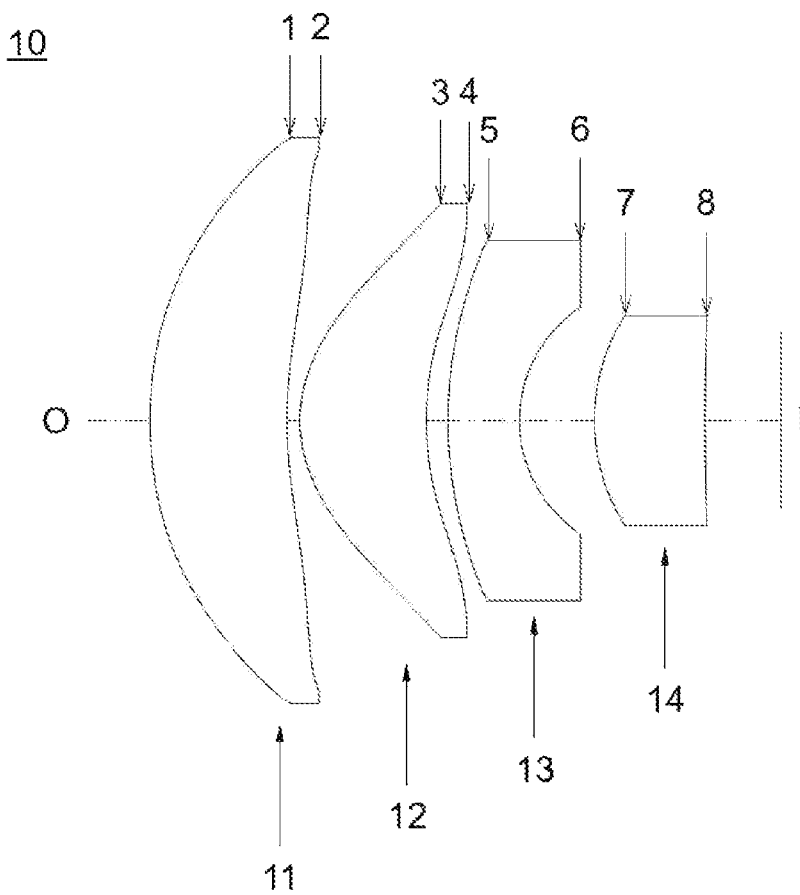
FIG. 1 is a diagram illustrating a lens optical system according to a first embodiment of the present invention.
Figure 2:
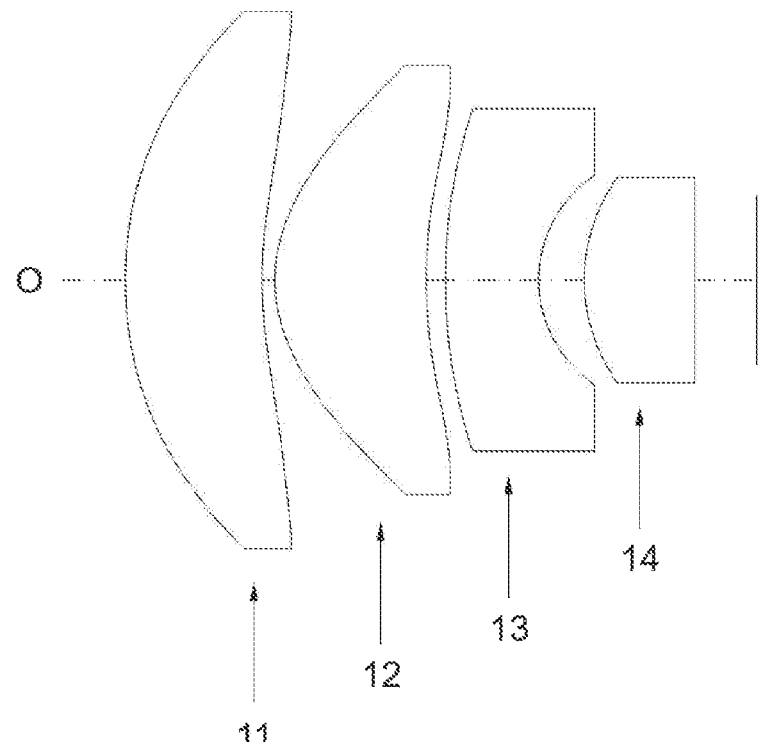
FIG. 2 is a diagram illustrating a lens optical system according to a second embodiment of the present invention.
Figure 3:
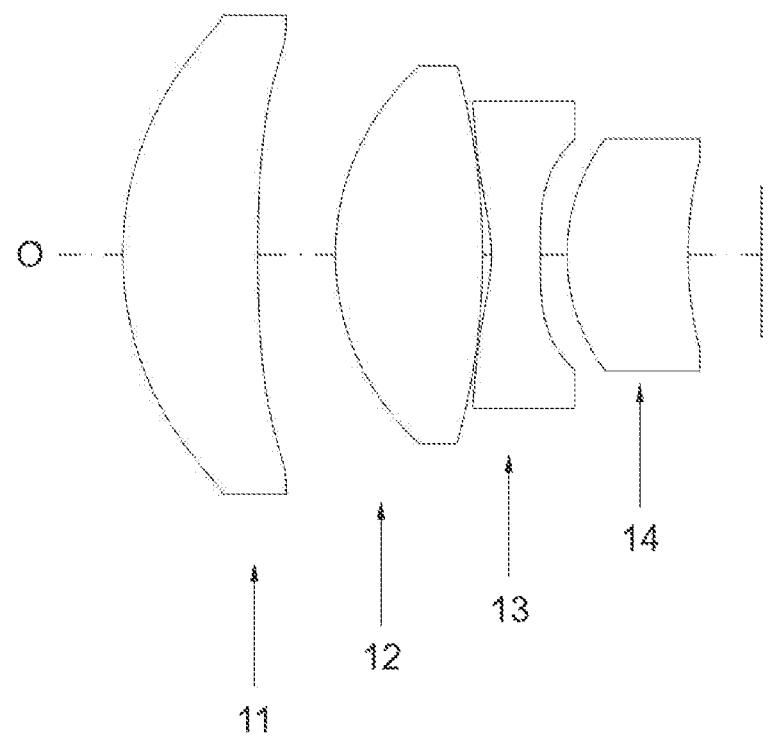
FIG. 3 is a diagram illustrating a lens optical system according to a third embodiment of the present invention.

10: Lens optical system
convex surface toward the object side and have positive refractive power, so both the focal lengths of the first lens and the second lens are configured to have positive values.

At the same time, in order not to increase the material cost, the number of lenses of the lens optical system of the present invention is 4 or less. However, in order to satisfy these conditions, a diameter of the first lens increases. Accordingly, the present invention applies a plastic material to the first lens, and thus, even if an aspherical surface is applied, the material cost of the product may be reduced.

Furthermore, when the lens optical system of the present invention is applied to a headlamp for a vehicle in which a light source is assembled on the image side, it is preferable to apply a glass material to a lens close to the light source so that the lens is not deformed by the high heat of the light source. Based on this, a lens made of glass is applied as the fourth lens.

As in the first and second embodiments, the lens optical system of the present invention may be formed of a lens in which the first to fourth lenses each have a convex surface toward the object side and have positive refractive power, and as in the third embodiment, the first lens, the second lens, and the fourth lens each are formed of a lens that has a convex surface toward the object side and has positive refractive power, and the third lens may be formed of a lens that has a concave surface toward the object side and has negative refractive power. In this case, a flint-type material having an Abbe number of 25 or less may be applied to the third lens disposed next to the first and second lenses. This has the advantage of correcting chromatic aberration.

Meanwhile, the resolving power performance required by the product may be satisfied only when the refractive power of the first lens and the second lens is properly designed. In order to satisfy this, the lens optical system of the present invention satisfies Formulas 1 and 2 below.

$$2 < \frac{f_1}{f_{12}} < 15 \qquad \langle\text{Formula 1}\rangle$$

Where, f1 denotes a focal length of the first lens, and f12 denotes a combined focal length of the first and second lenses.

$$0.8 < \frac{f_2}{f_{12}} < 2 \qquad \langle\text{Formula 2}\rangle$$

Where, f2 denotes a focal length of the second lens, and f12 denotes a combined focal length of the first and second lenses.

Formulas 1 and 2 are conditions for the focal lengths of the first lens and the second lens to reduce the total length of the optical system. When the focal length is smaller than the lower limits of Formulas 1 and 2, the first lens has strong refractive power, so the aberration increases, and when the focal length is greater than the upper limits of Formulas 1 and 2, the refractive power of the first lens is too weak, so the total length of the optical system becomes long.

Looking at Formulas 1 and 2 simultaneously, it can be seen that the focal length of the second lens is shorter than that of the first lens, and the resolving power of the optical system is maximized under this condition. Based on this, the lens optical system of the present invention can satisfy Formulas 1 and 2.

As an additional condition, the lens optical system of the present invention satisfies Formula 3 below.

$$0 \leq \frac{R_1}{R_2} \leq 1 \qquad \langle\text{Formula 3}\rangle$$

Here, R1 denotes the radius of curvature of the object side of the first lens, and R2 denotes the radius of curvature of the image side of the first lens.

It is not preferable for the first lens to be biconvex in order not to have too strong refractive power. In particular, it is advantageous to satisfy the meniscus shape in order to satisfy the aplanatic condition (condition for simultaneous correction of spherical aberration and coma aberration) even with a high NA. Based on this, the first lens has the meniscus shape. This condition means the lower limit of Formula 3, and the upper limit of Formula 3 means the condition that the refractive power of the first lens has a positive value. Based on this, the lens optical system of the present invention may satisfy Formula 3 below.

As an additional condition, the lens optical system of the present invention satisfies Formula 4 below.

$$0.25 \leq \frac{D_4}{D_1} \leq 0.5 \qquad \langle\text{Formula 4}\rangle$$

Where, D1 is a diameter of the first lens, and D4 is a diameter of the fourth lens.

When the refractive power of the first lens becomes too strong, the aperture of the fourth lens may become large since the refractive power of the first lens reaches the upper limit of Formula 4. In the opposite case, when the refractive power of the first lens is smaller than the lower limit of Formula 4, the aperture of the fourth lens becomes too small. When the aperture of the fourth lens becomes too small, a side effect occurs in that the difference between the brightness of the center and the brightness of the periphery of the optical system becomes too large. Based on this, the lens optical system of the present invention may satisfy Formula 4 below.

As an additional condition, the lens optical system of the present invention satisfies Formula 5 below.

$$0.3 \leq \frac{R_{min}}{f} \leq 0.5 \qquad \langle\text{Formula 5}\rangle$$

Here, Rmin denotes a radius of curvature of a side having the smaller absolute value among the radius of curvature of the object side (i.e., the curvature radius of the object-side surface) and the radius of curvature of the image side (i.e., the curvature radius of the image-side surface) of the third lens, and f denotes the total combined focal length of the first to fourth lenses.

For monochromatic aberration correction, Formula 5 needs to be satisfied. The third lens serves to correct aberrations generated when light is strongly refracted by the first and second lenses. Therefore, since the third lens also needs to have relatively strong refractive power, the radius of curvature of the object-side surface or the image-side surface of the third lens needs to be small. That is, Formula 5 means a condition for the radius of curvature of the third lens for correcting the aberration of the optical system. When the radius of curvature reaches the lower limit of Formula 5, the radius of curvature of the third lens becomes too small, and overcorrection of the aberration occurs due to the opposite aberration stronger than the aberration generated in the first and second lenses. In the opposite case, sufficient aberration correction is not achieved. Based on this, the lens optical system of the present invention may satisfy Formula 5 below.

As an additional condition, the lens optical system of the present invention satisfies Formula 6 below.

$$0.4 \leq \frac{R_7}{f} \leq 0.6 \qquad \langle\text{Formula 6}\rangle$$

Here, R7 denotes a radius of curvature of the object side of the fourth lens, and f denotes a total combined focal length of the first to fourth lenses.

The fourth lens serves to form an image again on the image side of light strongly diverged from the third lens and correct residual aberrations. Under the same conditions as the lens optical system according to the present invention, it is advantageous for the aberration correction that the fourth lens located right in front of the image side has positive refractive power convex toward the object side. Formula 6 is a condition for the radius of curvature of the object side of the fourth lens. The lower limit of Formula 6 is a condition in which the radius of curvature of the fourth lens becomes too small and the aberration rapidly increases. In the opposite case, since the radius of curvature of the fourth lens is too large, a problem occurs in that the aberration correction is not sufficiently performed, and the total length of the optical system increases. Based on this, the lens optical system of the present invention may satisfy Formula 6 below.

In this case, a material having a high refractive index as a refractive index of 1.7 or more may be applied to the fourth lens. In this way, when the material having the high refractive index is applied as the material of the fourth lens, there is an advantage in correcting astigmatism and a curvature of field.

As an additional condition, the lens optical system of the present invention satisfies Formula 7 below.

$$0 \leq \frac{R_3}{R_1} \leq 1 \qquad \langle\text{Formula 7}\rangle$$

Where R1 denotes a radius of curvature of the object side of the first lens, and R3 denotes a radius of curvature of the object side of the second lens.

This condition corresponds to the condition in which the focal length of the first lens is greater than that of the second lens. The lower limit of Formula 7 is the condition in which the object-side surface of the first lens and the object-side surface of the second lens have the same shape, and this disposed in front of the optical system, that is, the first lens and the second lens. To solve the problem, a crown-based material having an Abbe number of 50 or more may be applied to the first lens and the second lens, and accordingly, a change in focal length according to wavelength may be reduced, which is advantageous in correcting axial chromatic aberration.

Meanwhile, as the more aspherical surfaces are applied to the optical system, the manufacturing cost increases, but when the smaller aspherical surfaces are applied to the optical system, the resolving power performance may not be satisfied. Therefore, it is preferable that only about two aspherical lenses be used in an optical system with a high NA formed of 4 sheets like this lens optical system. When the aspherical surface is applied to the first lens, it is advantageous to correct off-axis aberration, and when the aspherical surface is applied to the second or third lens, it is advantageous to correct the spherical aberration. Based on this, in the lens optical system of the present invention, the first lens may be made of an aspherical lens, or the first lens is an aspherical lens, and either the second lens or the third lens may be made of an aspherical lens. The aspherical formula used in the present invention is as follows.

$$z = \frac{c \cdot x}{1 + \sqrt{1 - c^2(1 + k)x^2}} + Ax^4 + \dots \qquad \langle\text{Formula}\rangle$$

Here, z means the distance from the apex of the lens in the direction of the optical axis, x means the distance in the direction perpendicular to the optical axis, c means a reciprocal (1/r) of the radius of curvature at the apex of the lens, k means a conic constant, and A means an aspherical coefficient.

Hereinafter, specific data of the lens optical systems of the first to third embodiments will be described.

TABLE 1

| Lens optical system data of first example (f = 30.979 mm, NA = 0.7) | | | | | | |
|---|---|---|---|---|---|---|
| S# | Radius | Thick | diameter | EFL(d-line) | nd | vd |
| 1 (Object-side surface of first lens) | 32.31 | 10.497 | 44.4 | 338.578 | 1.535 | 55.7 |
| 2 (Image-side surface of first lens) | 34.872 | 1 | | | | |
| 3 (Object-side surface of second lens) | 11.017 | 9.693 | | 29.176 | 1.535 | 55.7 |
| 4 (Image-side surface of second lens) | 25.961 | 1.656 | | | | |
| 5 (Object-side surface of third lens) | 34.686 | 5.494 | | −18.676 | 1.94594 | 18 |
| 6 (Image-side surface of third lens) | 10.804 | 5.749 | | | | |
| 7 (Object-side surface of fourth lens) | 15.565 | 8.5 | 16.4 | 17.27 | 1.95375 | 32.3 |
| 8 (Image-side surface of fourth lens) | 207.466 | 5.619 | | | | |
| Image | infinity | 0.02 | | | | | condition is satisfied if both surfaces are convex. The lower limit of Formula 7 may be satisfied even if both of the corresponding surfaces are concave, but in this case, the total length of the optical system increases. The upper limit of Formula 7 means that the radius of curvature of the object-side surface of the second lens is smaller than the radius of curvature of the object-side surface of the first lens, which is the same as the condition in which stronger refraction occurs in the second lens than in the first lens. Based on this, the lens optical system of the present invention may satisfy Formula 7 below.

As in the lens optical system of the present invention, in the optical system in which the half-view angle is less than 20☐, in the optical system, the chromatic aberration may occur due to lenses having a positive refractive power

TABLE 2

| Lens optical system data of first example (Aspherical coefficients) | | |
|---|---|---|
| S# | K | A |
| 1 (Object-side surface of first lens) | 0.7 | 1.60E−05 |
| 2 (Image-side surface of first lens) | −12.4 | −1.80E−05 |
| 3 (Object-side surface of second lens) | −0.6 | −6.00E−05 |
| 4 (Image-side surface of second lens) | 0 | 4.20E−05 |

TABLE 3

| S# | Radius | Thick | diameter | EFL(d-line) | nd | vd |
|---|---|---|---|---|---|---|
| Lens optical system data of second example (f = 30.501 mm, NA = 0.7) | | | | | | |
| 1 (Object-side surface of first lens) | 33.252 | 10.73 | 43.5 | 343.365 | 1.535 | 55.7 |
| 2 (Image-side surface of first lens) | 36.035 | 1 | | | | |
| 3 (Object-side surface of second lens) | 12.456 | 11.9 | | 28.648 | 1.535 | 55.7 |
| 4 (Image-side surface of second lens) | 44.361 | 1.5 | | | | |
| 5 (Object-side surface of third lens) | 45.536 | 7.35 | | −15.872 | 1.94594 | 18 |
| 6 (Image-side surface of third lens) | 10.405 | 3.6 | | | | |
| 7 (Object-side surface of fourth lens) | 14.581 | 8.7 | 16.6 | 15.328 | 1.95375 | 32.3 |
| 8 (Image-side surface of fourth lens) | 4000 | 4.68 | | | | |
| image | infinity | 0.015 | | | | |

TABLE 4

| S# | K | A |
|---|---|---|
| Lens optical system data of second example (Aspherical coefficients) | | |
| 1 (Object-side surface of first lens) | 0.46 | 2.95E−05 |
| 2 (Image-side surface of first lens) | −4.96 | 5.02E−05 |
| 3 (Object-side surface of second lens) | −0.6 | −6.50E−05 |
| 4 (Image-side surface of second lens) | 3.21 | 0.02 |

TABLE 5

| S# | Radius | Thick | diameter | EFL(d-line) | nd | vd |
|---|---|---|---|---|---|---|
| Lens optical system data of third example (f = 30.57 mm, NA = 0.64) | | | | | | |
| 1 (Object-side surface of first lens) | 26.248 | 11 | 39.2 | 60.732 | 1.535 | 55.7 |
| 2 (Image-side surface of first lens) | 116.64 | 6.309 | | | | |
| 3 (Object-side surface of second lens) | 20.787 | 12 | | 36.721 | 1.437 | 95.1 |
| 4 (Image-side surface of second lens) | −58.017 | 0.7 | | | | |
| 5 (Object-side surface of third lens) | −13.774 | 4 | | −21.528 | 1.63494 | 24 |
| 6 (Image-side surface of third lens) | 2000 | 2.175 | | | | |
| 7 (Object-side surface of fourth lens) | 16.077 | 9.86 | 19 | 24.621 | 2.00069 | 25.5 |
| 8 (Image-side surface of fourth lens) | 32.076 | 5.995 | | | | |
| image | infinity | 0.015 | | | | |

TABLE 6

| S# | K | A |
|---|---|---|
| Lens optical system data of third example (Aspherical coefficients) | | |
| 1 (Object-side surface of first lens) | 0.14 | −2.30E−06 |
| 2 (Image-side surface of first lens) | −10 | 7.61E−06 |
| 5 (Object-side surface of third lens) | −10 | 1.66E−04 |
| 6 (Image-side surface of third lens) | −10 | 5.72E−04 |

TABLE 7

| | Example 1 | Example 2 | Example 3 |
|---|---|---|---|
| Result data after calculating Formulas | | | |
| NA | 0.7 | 0.7 | 0.64 |
| f | 30.969 | 30.501 | 30.57 |
| f1 | 338.578 | 343.365 | 60.732 |
| f2 | 29.176 | 28.648 | 36.721 |
| f12 | 29.735 | 29.357 | 27.889 |
| R1 | 32.31 | 33.252 | 26.248 |
| R2 | 34.872 | 36.035 | 116.64 |
| R3 | 11.017 | 12.456 | 20.787 |
| Rmin | 10.804 | 10.405 | 13.774 |
| R7 | 15.565 | 14.581 | 16.077 |
| D1 | 44.4 | 43.5 | 39.2 |
| D4 | 16.4 | 16.6 | 19 |

TABLE 7-continued

| | Example 1 | Example 2 | Example 3 |
|---|---|---|---|
| Result data after calculating Formulas | | | |
| eq (1) | 11.38651 | 11.696188 | 2.1776328 |
| eq (2) | 0.981201 | 0.975849 | 1.316684 |
| eq (3) | 0.926531 | 0.9227695 | 0.2250343 |
| eq (4) | 0.369369 | 0.3816092 | 0.4846939 |

TABLE 7-continued

| | Example 1 | Example 2 | Example 3 |
|---|---|---|---|
| Result data after calculating Formulas | | | |
| eq (5) | 0.348865 | 0.3411364 | 0.4505725 |
| eq (6) | 0.502599 | 0.4780499 | 0.5259078 |
| eq (7) | 0.340978 | 0.374594 | 0.7919461 |

As described above, according to the present invention, by efficiently arranging refractive power of four lenses, it is possible to implement an optical system capable of minimizing a total length of the optical system while having a high NA even by using a small number of lenses.

Although exemplary embodiments of the present invention has been described with reference to the accompanying drawings, those skilled in the art will appreciate that various modifications and alterations may be made without departing from the spirit or essential feature of the present invention. Therefore, it should be understood that the above-mentioned embodiments are exemplary in all aspects but are not limited thereto.

What is claimed is:

1. A lens optical system for a vehicle lamp having a light source that generates heat sufficient to deform an adjacent plastic lens, the system comprising:

a first lens;

a second lens;

a third lens; and a fourth lens, wherein:

the first lens, the second lens, the third lens and the fourth lens are sequentially arranged in order from an object side to an image side of the lens optical system, a numerical aperture (NA) of the lens optical system is 0.6 or more, the first lens and the second lens each has positive refractive power, the first lens is a lens comprised of a plastic material, the fourth lens is closer to a light source of the lamp than the first lens, the second lens and the third lens, and the fourth lens is comprised of a glass material so that the fourth lens is not deformed by the heat generated by the light source notwithstanding the fourth lens being closer to a light source of the lamp than the first lens, the second lens and the third lens.

2. The lens optical system of claim 1, wherein the following formula is satisfied:

$$2 < \frac{f_1}{f_{12}} < 15$$

(wherein $f_1$ denotes a focal length of the first lens, and $f_{12}$ denotes a combined focal length of the first and second lenses).

3. The lens optical system of claim 1, wherein the following formula is satisfied:

$$0.8 < \frac{f_2}{f_{12}} < 2$$

(where $f_2$ denotes a focal length of the second lens, and $f_{12}$ denotes a combined focal length of the first and second lenses).

4. The lens optical system of claim 1, wherein the following formula is satisfied:

$$0 \le \frac{R_1}{R_2} \le 1$$

(where $R_1$ denotes a radius of curvature of an object side of the first lens, and $R_2$ denotes a radius of curvature of an image side of the first lens).

5. The lens optical system of claim 1, wherein the following formula is satisfied:

$$0.25 \le \frac{D_4}{D_1} \le 0.5$$

(where $D_1$ is a diameter of the first lens, and $D_4$ is a diameter of the fourth lens).

6. The lens optical system of claim 1, wherein the following formula is satisfied:

$$0.3 \le \frac{R_{min}}{f} \le 0.5$$

(where $R_{min}$ denotes a radius of curvature of a side having a smaller absolute value of a radius of curvature of an object side and a radius of curvature of an image side of the third lens, and f denotes a total combined focal length of the first to fourth lenses).

7. The lens optical system of claim 1, wherein the following formula is satisfied:

$$0.4 \le \frac{R_7}{f} \le 0.6$$

(where $R_7$ denotes a radius of curvature of an object side of the fourth lens, and f denotes a total combined focal length of the first to fourth lenses).

8. The lens optical system of claim 1, wherein the following formula is satisfied:

$$0 \le \frac{R_3}{R_1} \le 1$$

(where $R_1$ denotes a radius of curvature of an object side of the first lens, and $R_3$ denotes a radius of curvature of an object side of the second lens).

9. The lens optical system of claim 1, wherein the first lens is an aspherical lens.

10. The lens optical system of claim 1, wherein the third lens has negative refractive power, and an Abbe number of a material comprising the third lens is 25 or less.

11. The lens optical system of claim 1, wherein the first lens is an aspherical lens, and at least one of the second lens and the third lens is an aspherical lens, and among the first to fourth lenses, a total number of aspherical lenses is two or fewer.

12. The lens optical system of claim 1, wherein the fourth lens has a refractive index of 1.7 or more.

13. The lens optical system of claim 1, wherein Abbe numbers of a material of which the first lens is comprised and a material of which the second lens is comprised are 50 or more.

14. The lens optical system of claim 1, wherein a diameter of the first to fourth lenses sequentially decreases from the first lens to the fourth lens.

15. The lens optical system of claim 1, wherein a side of each of the first, second and fourth lenses facing the object side of the lens system is convex.

16. The lens optical system of claim 1, wherein a side of the third lens facing the object side of the lens system is convex.

17. The lens optical system of claim 1, wherein a side of the third lens facing the object side of the lens system is concave.

* * * * *